Figure 2:
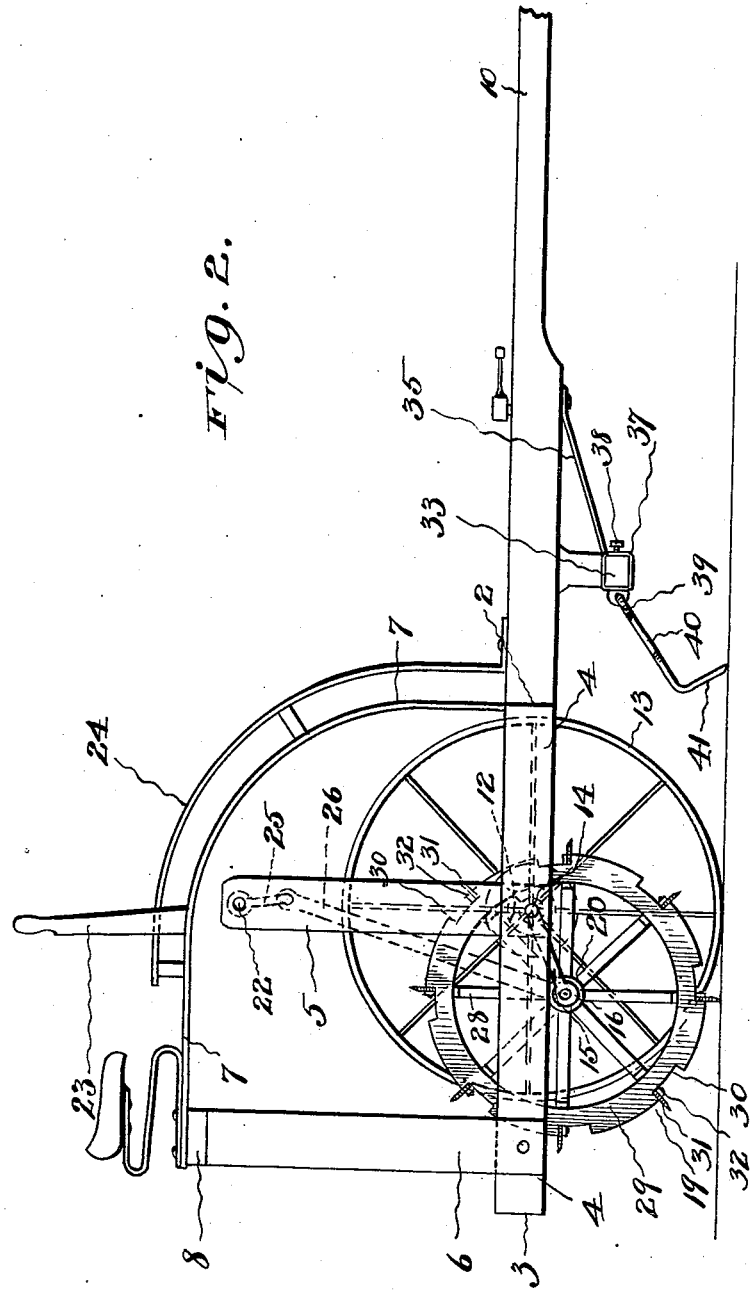

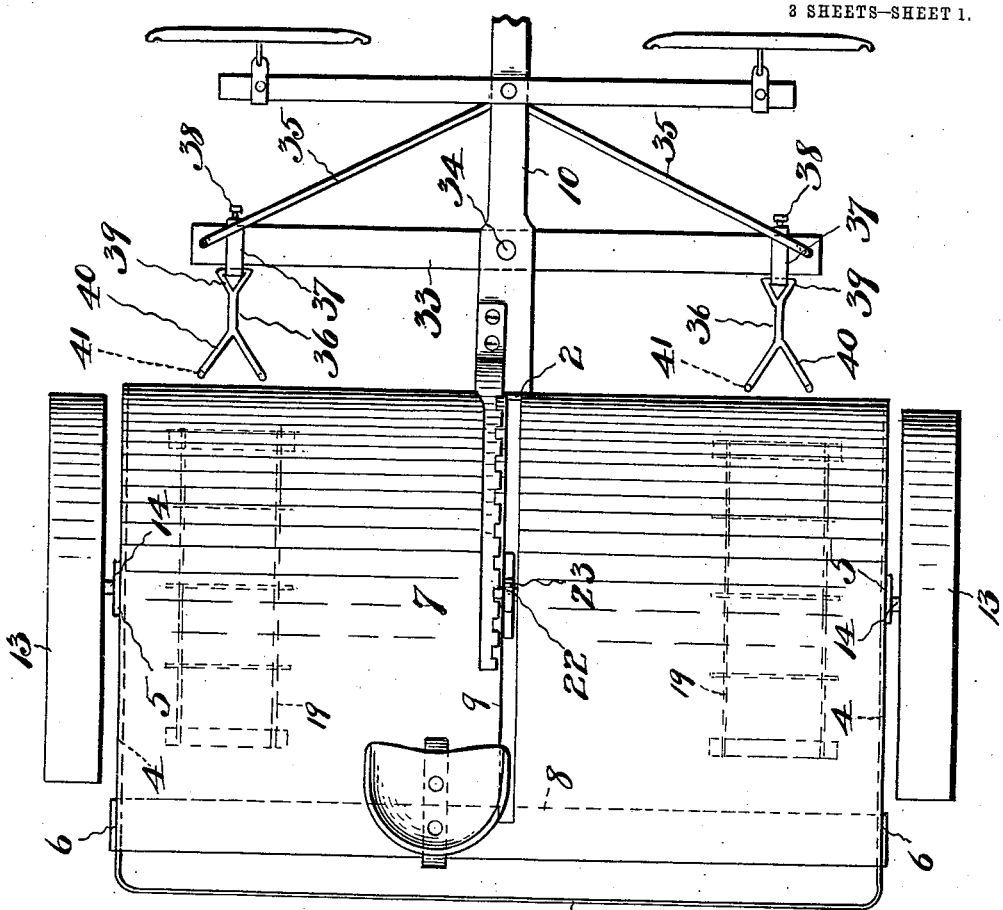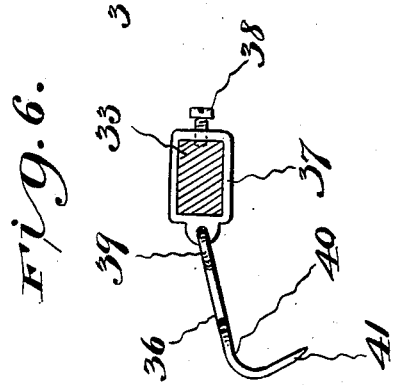

L. S. WILLIAMS.
STALK CUTTER.
APPLICATION FILED OCT. 4, 1912.

1,085,776.

Patented Feb. 3, 1914.
3 SHEETS—SHEET 2.

WITNESSES

INVENTOR

Attorney

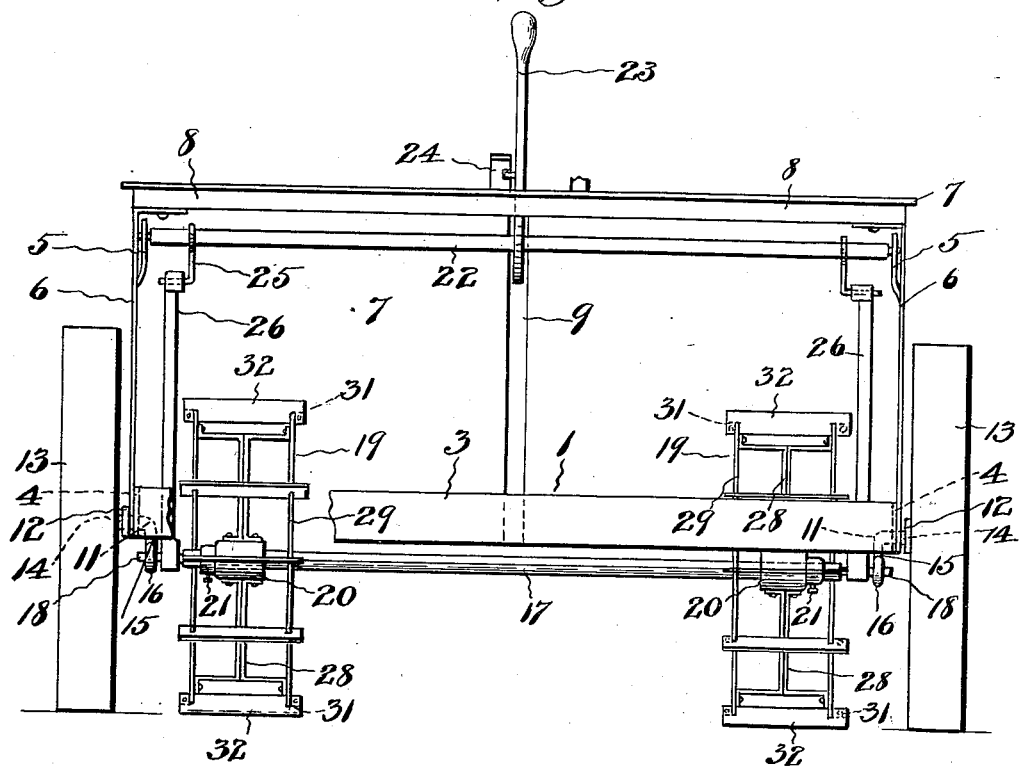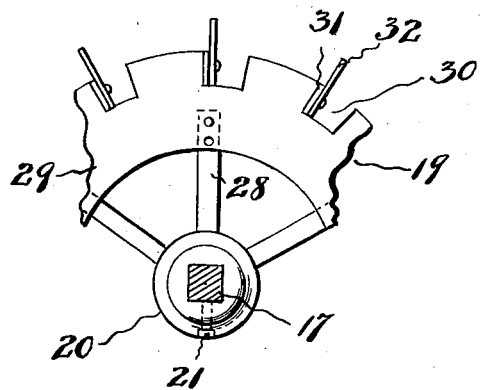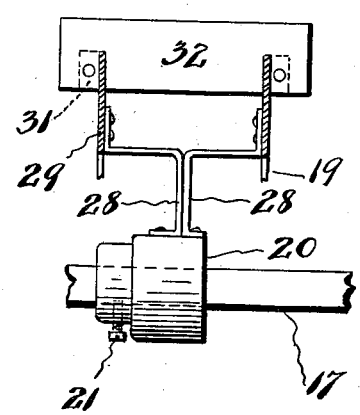

UNITED STATES PATENT OFFICE.

LEWIS SPINKS WILLIAMS, OF FAYETTEVILLE, NORTH CAROLINA.

STALK-CUTTER.

1,085,776.  Specification of Letters Patent.  Patented Feb. 3, 1914.

Application filed October 4, 1912. Serial No. 723,894.

*To all whom it may concern:*

Be it known that I, LEWIS SPINKS WILLIAMS, a citizen of the United States, residing at Fayetteville, in the county of Cumberland, State of North Carolina, have invented certain new and useful Improvements in Stalk-Cutters; and I do declare the following to be a full, clear, and exact description of the invention, such as will enable others skilled in the art to which it pertains to make and use the same.

My invention relates to an improvement in stalk cutters for use in cutting cotton and corn stalks or stalks of any other description and upon ground of any character.

The invention consists in the several features and combination of features as hereinafter described and claimed.

The object of the invention is to provide a stalk cutter which will cut two or more rows simultaneously and in which the cutters are adjustable to adapt them to rows of varying widths.

It further has for its object to provide a stalk cutter with means for pulling the stalks into line with the cutters and presenting them to said cutters at the proper angle for the most advantageous cutting.

It still further has for its object to provide a stalk cutter which is simple, inexpensive and durable in construction has a minimum number of parts and which is exceedingly easy and efficient in operation.

Referring to the drawings:—Figure 1 is a top plan view. Fig. 2 is a side view. Fig. 3 a rear elevation. Figs. 4 and 5 detail views of the cutter wheels and shaft. Fig. 6 a detail view of the drag.

In the drawings in which similar numerals of reference denote similar parts throughout the several views, 1 represents the framework of the stalk cutter which comprises a front portion 2, rear portion 3, side portions 4 and front and rear upwardly extending standards 5 and 6 respectively, 7 being a curved cover or shield having its upper edge attached to a bar 8 which connects the upper ends of the two rear standards 6, and 9 a slot in said cover. The cover 7 has a driver's seat mounted thereon. A tongue 10 is secured to the front portion of the framework and is adapted to have the usual swingle or doubletrees, not shown, secured thereon. Short crank axles 11 are provided which are pivoted in bearings 12 attached to the underside of the framework, and supporting wheels 13 are mounted on the outer ends 14 of the crank axles 11. The inner ends 15 of each of the crank axles is provided with a bearing 16 and a square shaft 17 having rounded ends 18 is mounted in said bearings. Cutter wheels 19, each having a sleeve 20 with a square hole therethrough to fit the shaft 17, are mounted on the said shaft 17 and turn with the same and said cutter wheels are capable of being adjusted laterally along the said shaft 17 to any point desired and held or secured at said points by means of set screws 21. A shaft 22 is mounted in the upper ends of the front standards 5 and is provided, preferably midway of its length, with a lever 23 which projects upwardly through the slot 9 of the cover 7 and engages a curved rack bar 24 rising from the tongue 10. Crank arms 25 project from the shaft 22 and a link 26 connects the outer end of each of said crank arms with the square shaft 17, the lower ends of said links being mounted on rounded portions 18 of said shaft 17.

Each of the cutter wheels 19, one or more of which may be used as desired, is provided, as previously stated, with a sleeve 20 and arms 28 project radially from said sleeve and the outer extremities have rings 29 bolted thereto and each of said rings has portions of its periphery cut out as at 30 and turned laterally outward to form lugs or brackets 31. Cutter blades 32 are secured by means of bolts to the lugs 31 and connect the two rings 29 of each cutter wheel, the cutting edge of each cutter blade projecting beyond the outer edges of the rings 29. Any number of cutter blades may be used and when they become dull or worn can be readily removed and sharpened or other blades substituted.

A bar 33 is secured to the tongue 10 by means of a bolt 34 and 35 are braces which extend from the tongue to the ends of the bar 3. Drags 36 are adjustably secured on the bar 33 by means of sleeves 37 and set screws 38, said drags comprising rings 39 pivoted to the sleeves 37 and forks 40 provided with depending teeth 41.

The object of having the drags is to draw the stalks downward and present them at the proper angle to the cutters, and the object of having them adjustable on the bar 33 is to enable them to be adjusted so as to be in line with the cutter wheels.

The object in having the cutter wheels adjustable laterally on shaft 17 is to allow them to be adjusted to fit rows of varying widths.

The vertical adjustment of the shaft 17 and the cutter wheels thereon is effected by means of the lever 23 which turns the shaft 22, causes the crank arms 25 to move upward, which moves the links 26 upward, and they in turn elevate the shaft 17 and cause the ends 15 of the crank axles also to move upward.

I do not desire to be understood as limiting myself to the specific details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claim.

What I claim is:

In a stalk cutter, a framework, crank axles having wheels and mounted on said framework, front and rear standards rising from said framework, a cover supported on the rear standards and having a slot therethrough, a rotatable square shaft having rounded ends journaled in the inner ends of the said crank axles, wheels with cutter blades, said wheels having sleeves with square holes therethrough which fit the square shaft, a rotatable shaft, above the square shaft, having its ends mounted in the top of the front standards and provided with an operating lever extending through the slot in said cover, crank arms rigidly mounted on said shaft and links located inside the framework and pivotally connected to said crank arms and their lower ends connected to the rounded portions of the said rotatable square shaft, substantially as described.

In testimony whereof I affix my signature in the presence of two witnesses.

LEWIS SPINKS WILLIAMS.

Witnesses:
F. D. WILLISTON,
JIM McLERAN.

---

Copies of this patent may be obtained for five cents each, by addressing the "Commissioner of Patents. Washington, D. C."